(12) United States Patent
Gojman Goldberg

(10) Patent No.: US 8,663,768 B2
(45) Date of Patent: Mar. 4, 2014

(54) ADHESIVE STRIP FOR ADHERING OBJECTS TO A RIGID SURFACE

(75) Inventor: Marcos Gojman Goldberg, Mexico City (MX)

(73) Assignee: El Ancla Bolsas Y Empagques, S. A. De C.V. (MX)

( * ) Notice: Subject to any disclaimer, the term of this patent is extended or adjusted under 35 U.S.C. 154(b) by 944 days.

(21) Appl. No.: 12/581,391

(22) Filed: Oct. 19, 2009

(65) Prior Publication Data

US 2011/0091671 A1    Apr. 21, 2011

(51) Int. Cl.
*B65D 65/28*    (2006.01)
*B32B 1/08*    (2006.01)

(52) U.S. Cl.
USPC ........... 428/43; 428/35.2; 428/40.1; 206/231; 24/30.5 R

(58) Field of Classification Search
USPC ............... 40/306, 310, 312, 359, 360, 475, 40/642.01, 643, 644, 661.09, 672; 428/40.1, 41.9, 42.1, 42.2, 42.3, 43, 428/44, 46, 47, 51, 121, 124, 126; 383/82, 383/89, 203, 211, 86, 95, 25, 6, 29, 59, 78, 383/102, 87, 120; 156/226, 227, 443; 283/70, 72, 75, 79–81, 101, 108; 206/205.3, 317, 683, 231
See application file for complete search history.

(56) References Cited

U.S. PATENT DOCUMENTS

| 1,128,192 | A | * | 2/1915 | Smith | 383/62 |
|---|---|---|---|---|---|
| 1,133,911 | A |  | 3/1915 | Barnard |  |
| 2,098,164 | A | * | 11/1937 | Rice | 40/638 |
| 2,215,989 | A |  | 9/1940 | Wolf |  |
| 2,620,842 | A |  | 12/1952 | Hoeppner et al. |  |
| 2,689,594 | A |  | 9/1954 | Wendt |  |
| 2,774,531 | A |  | 12/1956 | Rosenthal |  |
| 2,855,137 | A |  | 10/1958 | Simonsen |  |
| 2,861,735 | A |  | 11/1958 | Faltin |  |

(Continued)

FOREIGN PATENT DOCUMENTS

| JP | 2002137571 | 5/2002 |
|---|---|---|
| JP | 2003251966 | 9/2003 |

(Continued)

OTHER PUBLICATIONS

ISR International Search Report for PCT/US10/052804, mailed Jun. 28, 2011.

(Continued)

*Primary Examiner* — Michele L Jacobson
*Assistant Examiner* — Lee Sanderson
(74) *Attorney, Agent, or Firm* — Fleit Gibbons Gutman Bongini & Bianco; Paul D. Bianco; Gary S. Winer

(57) ABSTRACT

An adhesive strip can adhere to objects and to a surface such as a surface in a vehicle passenger compartment to support the object within reach of the passengers. The adhesive strip is removable from the surface and provides a mechanism for folding the adhesive back so that the adhesive is covered and not free to attach unintentionally to objects or surfaces after removal from the initial surface. A method for using the strip allows the strip to be used to adhere objects to surfaces and then avoid adhering unintentionally after removal to other objects and surfaces. A method for making the adhesive strips is provided. A device for making the adhesive strips is provided.

18 Claims, 7 Drawing Sheets

(56) References Cited

U.S. PATENT DOCUMENTS

| | | | |
|---|---|---|---|
| 2,894,675 A | 7/1959 | Stein | |
| 2,906,478 A | 9/1959 | Merrick | |
| 2,920,670 A | 1/1960 | Mohlmann | |
| 2,925,675 A | 2/1960 | Lumpkin | |
| 3,003,402 A | 10/1961 | Stein | |
| 3,089,586 A | 5/1963 | Cole | |
| 3,109,578 A | 11/1963 | Davis | |
| 3,110,231 A | 11/1963 | Stein | |
| 3,162,305 A | 12/1964 | Schoppa | |
| 3,184,149 A | 5/1965 | Repko | |
| 3,203,621 A | 8/1965 | Wright | |
| 3,214,080 A | 10/1965 | Wolfson | |
| 3,426,958 A | 2/1969 | Gore | |
| 3,508,700 A | 4/1970 | Kelly | |
| 3,510,052 A | 5/1970 | Ruda | |
| 3,589,595 A | 6/1971 | White | |
| 3,747,776 A | 7/1973 | Gross | |
| 3,942,713 A | 3/1976 | Olson et al. | |
| 3,994,085 A * | 11/1976 | Groselak et al. | 40/665 |
| 4,830,406 A * | 5/1989 | Instance | 283/81 |
| 4,865,352 A * | 9/1989 | Gollon | 283/79 |
| 4,871,265 A | 10/1989 | Peck | |
| 5,203,591 A * | 4/1993 | Treat | 283/81 |
| 5,253,899 A | 10/1993 | Greenwood | |
| 5,511,883 A * | 4/1996 | Clark et al. | 383/22 |
| 5,695,219 A * | 12/1997 | Crawford | 283/39 |
| 5,700,537 A * | 12/1997 | Instance | 428/41.9 |
| 5,704,649 A * | 1/1998 | Small | 283/81 |
| 5,772,331 A * | 6/1998 | Irace et al. | 383/90 |
| 5,824,380 A * | 10/1998 | Hagen | 428/41.9 |
| 5,855,434 A * | 1/1999 | Hagen | 383/89 |
| 5,866,181 A * | 2/1999 | Hill | 426/107 |
| 6,497,063 B1 * | 12/2002 | Stephens | 40/638 |
| 6,595,550 B1 * | 7/2003 | Meazzi | 283/79 |
| 6,695,364 B2 * | 2/2004 | Bierlin | 292/307 A |
| 6,701,571 B2 * | 3/2004 | Hagen | 16/114.1 |
| 6,833,172 B1 * | 12/2004 | Schwartz | 428/40.1 |
| 7,243,796 B2 * | 7/2007 | Grablick | 206/460 |
| 7,427,161 B2 * | 9/2008 | Sill et al. | 383/25 |
| 7,673,406 B2 * | 3/2010 | Giro Amigo | 40/299.01 |
| 7,794,809 B2 * | 9/2010 | Plummer | 428/40.1 |
| 2003/0168868 A1 * | 9/2003 | Bierlein | 292/307 A |
| 2004/0099626 A1 * | 5/2004 | Belt | 211/113 |
| 2005/0042445 A1 * | 2/2005 | van Driesten | 428/343 |
| 2006/0019052 A1 * | 1/2006 | Plummer | 428/40.1 |
| 2006/0145860 A1 * | 7/2006 | Brown et al. | 340/572.7 |
| 2007/0235599 A1 * | 10/2007 | Seidl | 248/95 |

FOREIGN PATENT DOCUMENTS

| | | | |
|---|---|---|---|
| JP | 2005196377 | | 7/2005 |
| JP | 2005196377 A | * | 7/2005 |
| JP | 2006150952 | | 6/2006 |

OTHER PUBLICATIONS

PCT Written Opinion for PCT/US10/052804, mailed Jun. 28, 2011.

* cited by examiner

ADHESIVE STRIP FOR ADHERING OBJECTS TO A RIGID SURFACE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to adhesive strips, method of making adhesive strips, methods of using adhesive strips, and devices for manufacturing adhesive strips.

2. Description of the Related Art

Throughout the daily use of a motor vehicle, passengers need to dispose of litter, write down information, use a tissue, or freshen the air. Currently, motor vehicles are not equipped with a solution or device that can attach temporarily the litter bag, writing pad, tissue package, or air freshener. Although many different devices have been invented, most are not usable today because of changes made in the design of the interior of the motor vehicle.

Prior devices hung from knobs in the vehicle compartment. In particular, prior-art devices hung from window cranks. The prior-art devices had a hole formed therein for hanging the device from the knob.

However, the elimination of most of the knobs in a vehicle cabin has made the prior-art devices obsolete. Contemporary vehicle designs have eliminated cranks used to open windows and knobs that operate the radio or lighter.

The main solution to this problem has been the use of a double sided adhesive tape or glue applied directly to a paper or plastic bag either during or after the manufacturing process of the bag.

The bags that have the adhesive applied during the manufacturing process have the disadvantage of a fixed size being manufactured, and the requirement of a complex procedure to change the size of the bag in any or all of its three measurements (i.e. length, width, and depth).

On the other hand, the bags that have the adhesive applied after they have been manufactured have the drawback of applying the tape or adhesive with a mechanically inefficient procedure or the use of manual labor.

In both cases, none of the previous art solves the problem of closing the bag after it has been filled with litter, nor do they solve the problem of the disposal of the used litter bag, writing pad, tissue package, or air freshener. They are difficult to dispose of because the double sided adhesive remains exposed and ready to attach to any other surface or object. When people remove the device from a surface and throw the device with exposed adhesive into a larger trash container, the adhesive ultimately adheres and attach itself to the trash container or to other debris.

In the case of plastic bags that are used as litter deposits in vehicles, the environment is their major setback, as plastic bags are more complex to recycle or degrade.

Also, in the prior art, other factors were not considered. First, the ergonomics and handling of the litter bag, writing pad, or tissue package were poorly constructed. The location of the double sided adhesive must be higher than the point where the hand touches that object. Our research showed that if the adhesive is at the same level or below the point where the hand touches the object, the adhesive will start separating from the panel where it was attached. Soon thereafter, the litter bag, the writing pad, or the tissue package, will detach itself and fall to the floor. Second, the position of the adhesive strip must be parallel to the floor and as wide as possible so the adhesive can resist better the pull of gravity and the handling by the user, which is also pulling in the same direction. Most of the previous art has the adhesive perpendicular to the floor, making the attachment to the panel tangibly weaker.

BRIEF SUMMARY OF THE INVENTION

An object of the invention is to provide a removable adhesive strip that can support objects particularly within a vehicle cabin. The adhesive strip should "close" in such a way that the adhesive cannot attach to objects unintentionally after use.

A further object of the invention is to provide a method of using an adhesive strip in such a way that the adhesive is effective in use and then is prevented from adhering to objects unintentionally after use.

A further object of the invention is to provide a method of manufacturing an adhesive strip that can be adjusted to create different sized adhesive strips for adhering different sized objects.

A further object of the invention is to provide a device that manufacturers adhesive strips of various sizes.

The adhesive strip according to the invention, includes a folded strip of paper with one side wider than the other. Both the wide part and the narrow part are glued to each other at the bottom part of the narrow part. Additionally, a piece of double sided adhesive tape is fixed in the upper part of the wide part of the strip of paper. A score (i.e. a horizontal score line) is located below the adhesive tape. The strip of paper can be glued to an object. Potential objects include a paper bag to be used for litter disposal, a writing pad, a small pack of tissue, or an air freshener. The adhesive strip can be attached to any rigid surface by removing the protective backing of the double sided adhesive. It is primarily, though not exclusively, intended for use in cabins of motor vehicles.

The score is used to separate the part of wide part with the adhesive tape to fold the part with the adhesive tape to the other side where it can be adhered. When a liter bag is adhered to the front of the adhesive strip, the part with the adhesive tape can be folded over to the front of the bag to close the litter bag when it is full and ready to be disposed. The part with the adhesive can be folded over to dispose of the writing pad support, the empty bag of tissue, or the air freshener.

The strip of paper mentioned is prepared in a machine specifically designed to fold the strip of paper, which is already scored and printed with copy and/or advertisements if desired, to apply the glue to fix the two parts, to apply the double sided adhesive, to apply glue to the wide part and fix the object (i.e. the paper bag, the writing pad, the tissue package, or the air freshener), and to cut the paper strip when the assembly is finished.

With the foregoing and other objects in view there is provided, in accordance with the invention, a strip for adhering an object to a surface. The strip includes a wide part, a narrow part, a fold, an adhesive, and a surface adhesive. The wide part has a front face and a rear face. The wide part has a score for tearing formed therein. The score is a horizontal score line. The directions (i.e. "horizontal" "front" "rear" "left" "right") given in the specification are used to define the parts in relation to each other but are not intended to limit the parts position with relation to the external environment. The score divides the wide part into an upper part and a lower part. The narrow part with a front face and a rear face is narrower (i.e. from top to bottom) than the wide part but is wide enough to extend below the score when the narrow part is folded with regard to the wide part. The fold joins the wide part and the narrow part. The adhesive adheres the rear face of the lower part of the wide part to the rear face of the narrow part. The surface adhesive is disposed on the front face of said upper part of said wide part for adhering to a surface.

A surface adhesive can be added to attach the strip to a surface. The surface adhesive adheres to the strip and to the surface on which the strip is to be mounted. The surface adhesive can be a double sided adhesive such as double sided tape. The surface adhesive can be applied to the front face of the upper part of the wide part of the strip. The surface adhesive can have a removable backing so the surface adhesive can be initially adhered to the strip. Then, the backing can be subsequently removed and then the surface adhesive can be adhered to the mounting surface. The surface adhesive can be a type that can be pulled away from the surface without leaving adhesive on the surface. After the adhesive is removed from the contact surface, the upper part can be separated from the lower part by tearing along the score and the upper part can be folded over to the front face of the narrow part. The exposed surface adhesive can be adhered to the front face of the narrow part when folded over.

Placing the surface adhesive higher than the top of the object being adhered to the strip creates improved adhesion to the surface. When the surface adhesive is at the same height as the top of the object, studies by the Applicant have shown that the strip immediately adheres to the surface properly; however, the adhesion will fail sooner than when the surface adhesive is disposed higher than the top of the object. Accordingly, the strip provides surface adhesive on the wide part at a higher location than where the object is to be adhered to the rear face of the wide part.

The strip can be adhered to a surface and then removed and the surface adhesive can be prevented from adhering to other surfaces. To do this, first, the strip is removed from the surface. Next, the score is torn. The top part of the wide part is then folded over and the surface adhesive is adhered to front face of the narrow part or to an object adhered to the narrow part.

The strip can be made of any material that is foldable and that can receive a score and that is tearable after being scored. Paper and cardboard are useful materials because they match these qualities and they are inexpensive and easily processed.

The surface adhesive can be double sided adhesive tape. The adhesive tape can be applied to the front face of the upper part of the wide part of the strip. A back face of the double sided tape adheres to the strip. A front face has a removable backing. When the backing is removed from the double-sided tape, the double-sided tape can be used to adhere to a surface on the car. The double-sided tape can include an adhesive that will support the weight of the object on the strip and that will not deteriorate in the heat of a parked car. The adhesive strip also can include an adhesive that does not leave a mark when removed from a vehicle dashboard.

Object adhesive can be added to the front face of the narrow part of the strip for adhering the object to be held to the strip. The adhesive can be applied when the strip is made and the object can be attached at the factory. Alternatively, the adhesive can be applied at a later time and place then when the strip is manufactured. The adhesive strip can be a double-sided adhesive with a backing that is applied during the manufacturing of the strip and then the object is adhered later.

Objects can be adhered to the strip, in particular to the front face of the narrow part via the object adhesive. A bag having a rim around an opening can have a rear edge adhered to the strip. When the bag is to be removed from the car, the surface adhesive is removed from the surface, the score is torn and the upper part of the wide part is folded over the bag. The surface adhesive is attached to the front of the bag to close the bag.

Other objects that are needed within a vehicle can be adhered to the strip via the object adhesive. Possible objects include a dispenser (for example, a scented strip) for an air freshener adhered to said object adhesive, a writing pad, and a package for facial tissues. Disposable objects are particularly suited for attachment with the strip because the strip provides an easy way for removing the used object in which the surface adhesive is subsequently prevented from becoming accidentally adhered after removal.

An advertisement can be printed on the strip. The advertisement can be printed so the advertisement is visible when the strip is sold. The advertisement can be visible when the strip is adhered to an object and a surface. The advertisement can be for the manufacturer of the strip or for a third party. The advertising can act as a promotional tool. The advertisement can be printed on the front face of the narrow part. The material forming the strip can be preprinted with the advertisement before the strip is assembled.

The invention encompasses a method for using the strip to prevent a surface adhesive from unintentionally attaching to surfaces after removal from an intended surface. The surface adhesive can be adhered with the surface adhesive to an object before tearing the score. A next step of the method is tearing the score between the upper part and the lower part. The next step is folding the upper part over the front face of the narrow part after tearing the score. The surface adhesive can be attached to the front face of the narrow part or to an object adhered to the narrow part. The back side of the upper part prevents the surface adhesive from adhering to other surfaces unintentionally.

The method of using the strip can be used to close a bag that is adhered to the front face of the narrow part of the strip. The "rear" (i.e. closest to the strip) of the bag is adhered with the object adhesive to the front face of the narrow part. When the bag is full, the bag can be sealed close by removing the strip from the surface, then tearing the score, then folding the upper part of the wide part of the strip over and then adhering the surface adhesive to the front of the bag.

The invention encompasses a process for manufacturing the strip. A typical starting material for use in the method is a strip of paper having a score line formed lengthwise (i.e. along the longest dimension) therein. The strip can be provided as a roll. The scoreline is formed on a lateral side (i.e. not the symmetric middle) of the strip. The initial step is then folded lengthwise and asymmetrically to form a narrow part and a wide part. The strip is folded so that the scoreline is disposed on the wide part. The narrow part is wide enough to extend below this scoreline when the narrow part has been folded. The scoreline divides the wide part into the upper part and the lower part. After the folding step, the narrow part is adhered to a lower part of said wide part, i.e. below the score line. This configuration allows the upper part to be separated from connecting directly to the lower part by tearing along the score, while remaining connected to the lower part via the narrow part.

The method of manufacturing the step also includes disposing a surface adhesive on an outer face (i.e. the face that is away from the folded narrow part) of the upper part of said wide part. The upper part is defined as the part of the wide part that is above the score line. A roll with double sided tape can fed from the roller with one side exposed. The exposed side is attached to the upper part of the wide part. As the strip is folded and glued the surface adhesive can be rolled lengthwise onto the strip.

The method of making the strip further involves applying an object adhesive to the front face (i.e. the face of the narrow part facing away from the wide part when the strip is folded) of the narrow part. A roller rotating in a vat of adhesive (i.e. glue) can be used to roll a stripe of the object adhesive onto the passing strip. The adhesive and the object adhesive can be applied simultaneously, as one stripe. As the strip is produced and moved lengthwise along an assembly line, a roller with a bottom portion in a vat of adhesive can roll a strip of the adhesive passing along a top of the roller.

The method of manufacturing the step can include adhering an object to the object adhesive. Either before or after object is adhered to the strip, the strip can be cut to correspond to the length of the object.

Other features that are considered as characteristic for the invention are set forth in the appended claims.

Although the invention is illustrated and described herein as embodied in an adhesive strip for adhering objects to a surface, a method for using the adhesive strip, a method for manufacturing the strip, and a device for manufacturing the strip, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 2, 3:
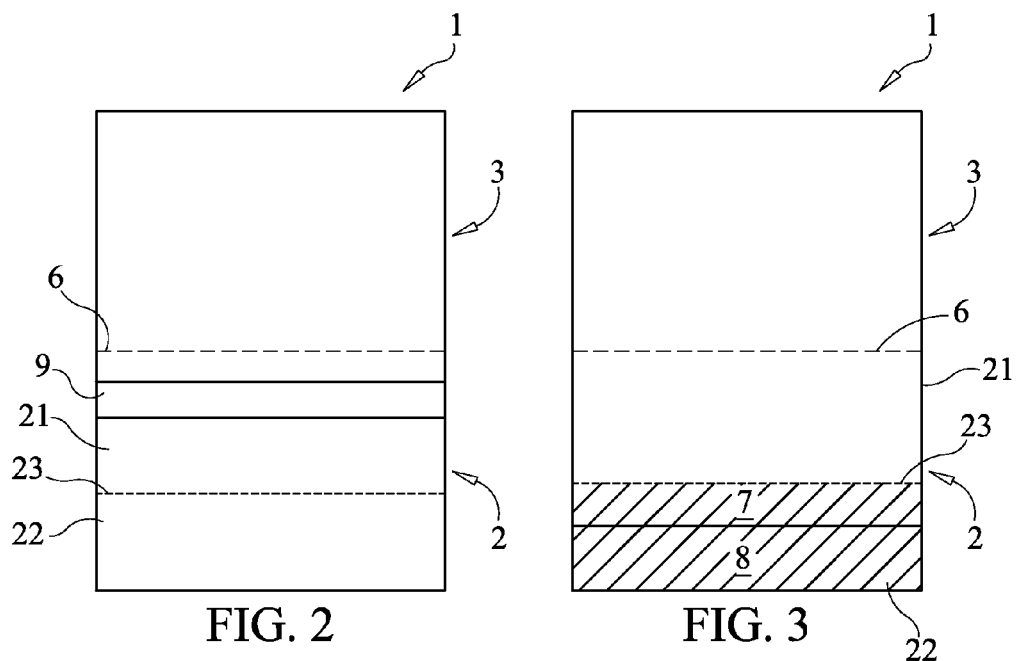
FIG. 2 is front side view of the strip shown in FIG. 1 while in an unfolded condition.
FIG. 3 is a rear side view of the strip shown in FIG. 2

Referring now to the figures of the drawing in detail and first, particularly, to FIGS. 2-3 thereof, there is seen a strip 1. The strip 1 is divided into a wide part 2 and a narrow part 3. A fold 6 runs lengthwise (i.e. left to right in the drawing) between the wide part 2 and the narrow part 3. A front face of the strip 1 is shown in FIG. 2. A rear face of the strip 1 is shown in FIG. 3.

A score 23, and more preferably a scoreline 23, runs lengthwise on the wide part 2. The score 23 divides the wide part 2 into an upper part 21 and a lower part 22.

Figure 4:
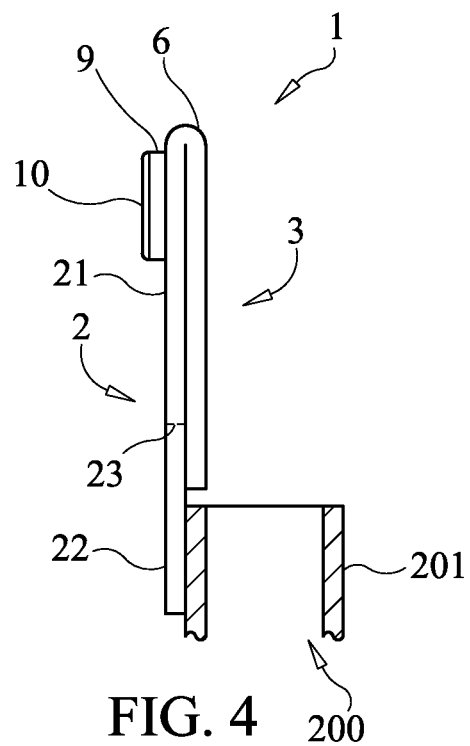
FIG. 4 is a left side view of the strip in a folded untorn condition.
Figure 5:
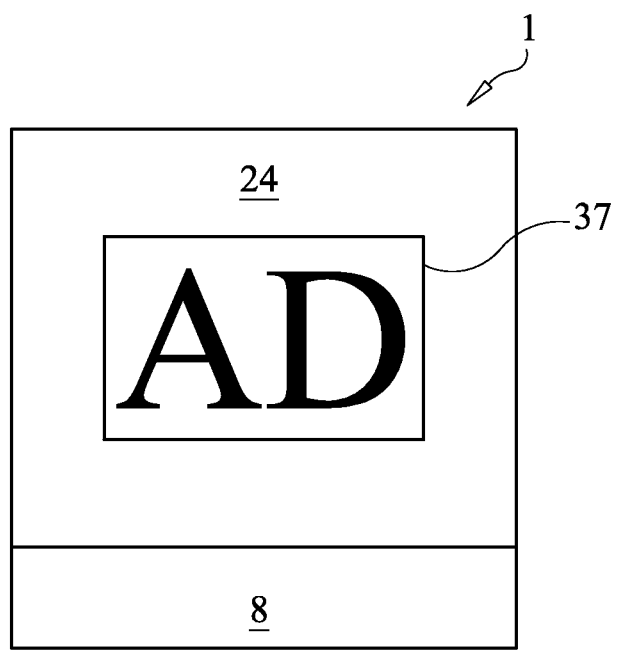
FIG. 5 is a rear side view of the strip shown in FIG. 3 in the folded untorn condition.

Adhesive 7 is disposed on the rear face of the strip 1 below the score 23. When the narrow part 3 is folded rearward along the fold 6, the rear face of the narrow part 3 is adhered to the rear face of the lower part 22 of the wide part 2. The resulting folded strip 1 is shown in FIG. 4.

A surface adhesive 9 is disposed on the front face of the upper part 21 of the wide part 2. The surface adhesive 9 is preferably double-sided tape. A removeable backing 10 is disposed on the front face of the surface adhesive 9. The backing 10 is removed from the surface adhesive 9 when the strip 1 is to be adhered to a surface.

Object adhesive 8 is disposed on the rear face of the wide part 2 that remains exposed below the narrow part 3. Objects are adhered to the strip 1 by placing the object on the object adhesive 8. Preferred embodiments of the object include a bag 200, an air freshener dispenser (e.g. a scented card), and a writing pad.

An advertisement 37 is printed on the front face 24 of the narrow part 3. The advertisement 37 is preferably for a third party other than the manufacturer of the strip 1 or the manufacturer of the object.

Figure 10:
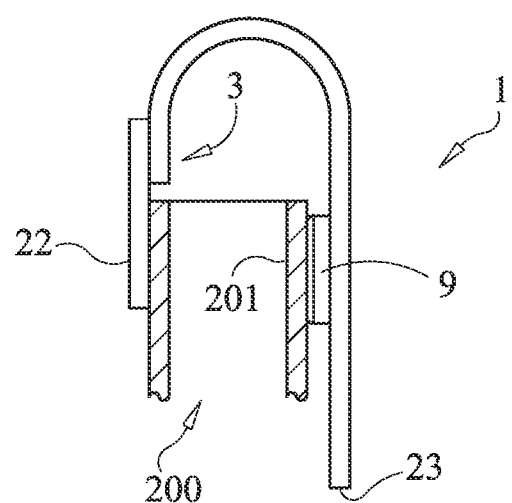
FIG. 10 is a left side view of the strip shown in FIG. 4 after being torn and folded over.

As shown in FIG. 10, when the object is no longer needed, the strip 1 is removed from the surface by peeling the surface adhesive 9 from the surface. Next, the score 23 is torn. The upper part 21 of the wide part 2 folded back. The surface adhesive 9 then can be adhered to the front face of the narrow part 3. If a bag 200 is adhered to the object adhesive 8, the surface adhesive can be attached to a front 201 of the edge of the bag to close the bag.

Figure 1:
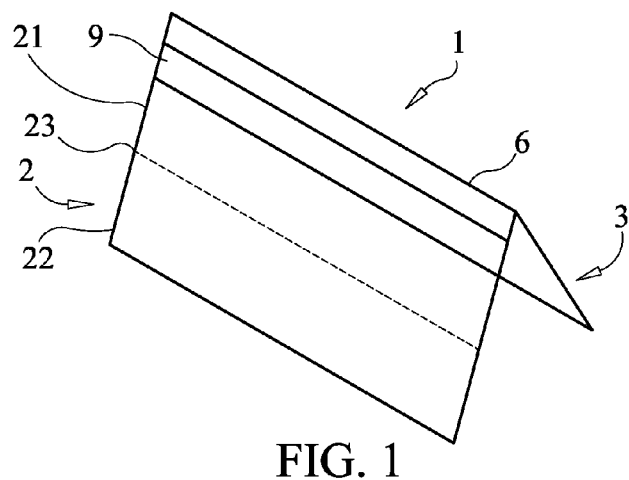
FIG. 1 is a perspective view of a partially folded strip according to the invention.
Figure 6:
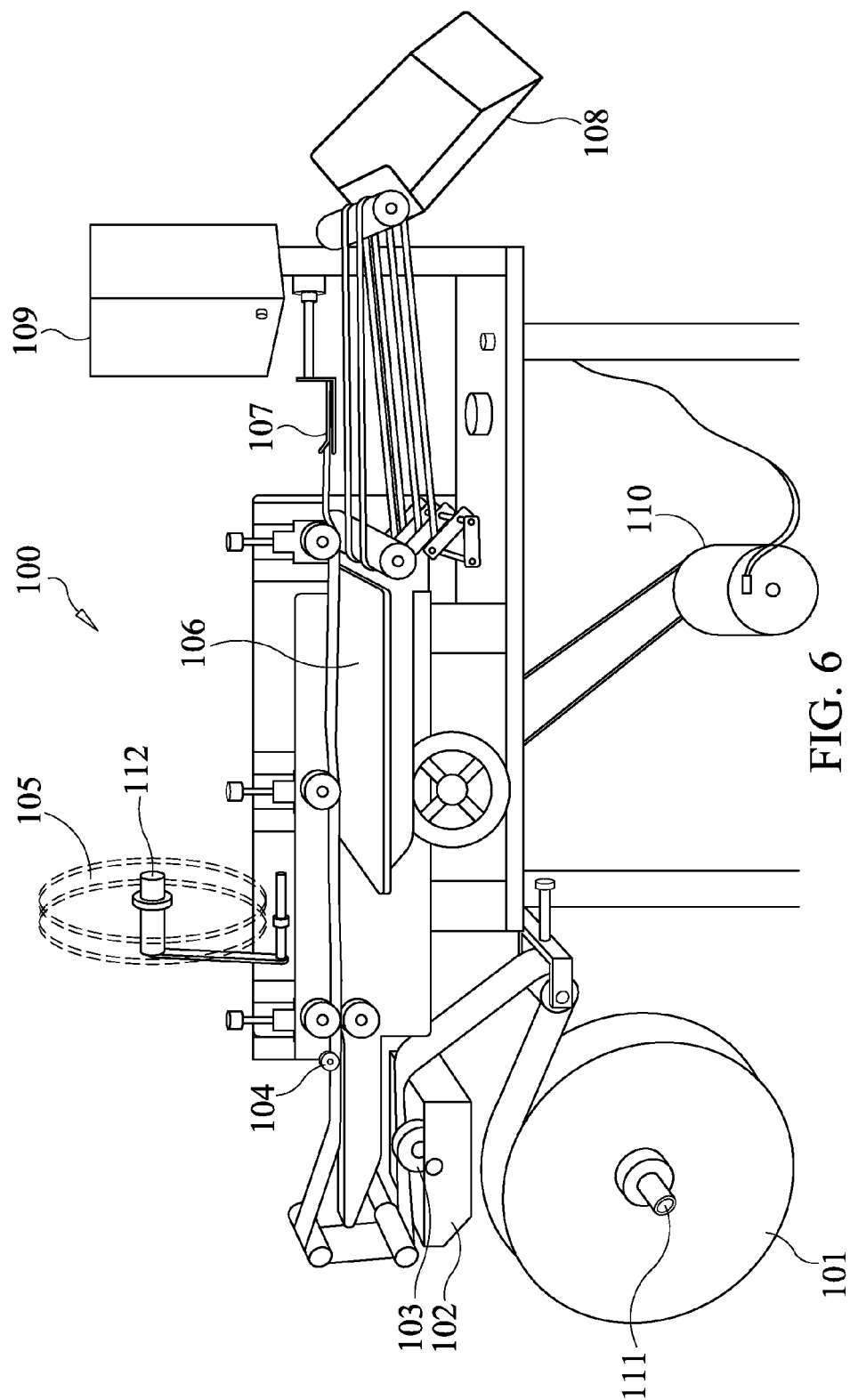
FIG. 6 is a front perspective view of a device according to the invention for manufacturing the adhesive strip.
Figure 7:
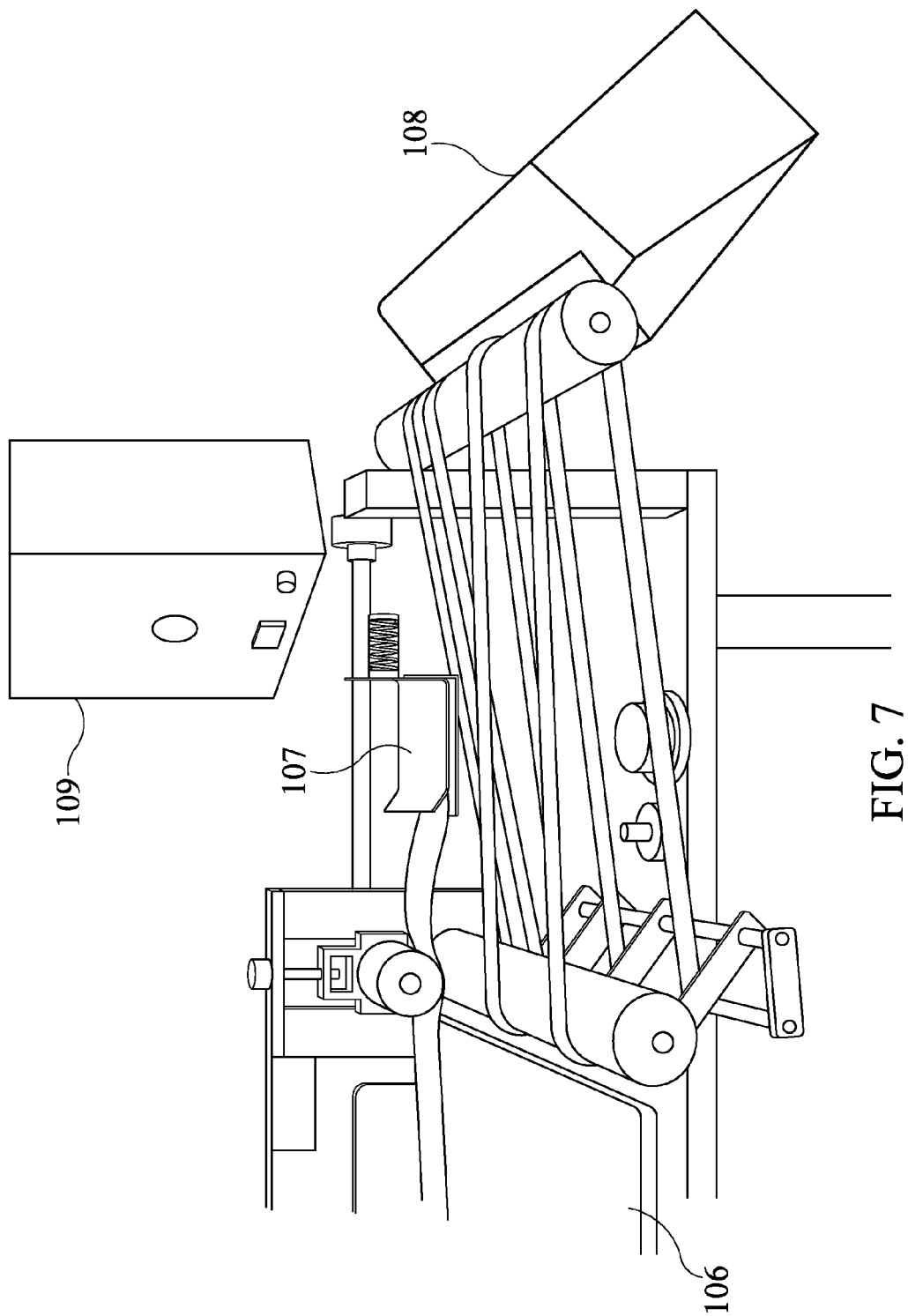
FIG. 7 is a partial front perspective view of a portion of the device shown in FIG. 6 that performs last steps in the manufacturing process.
Figure 8:
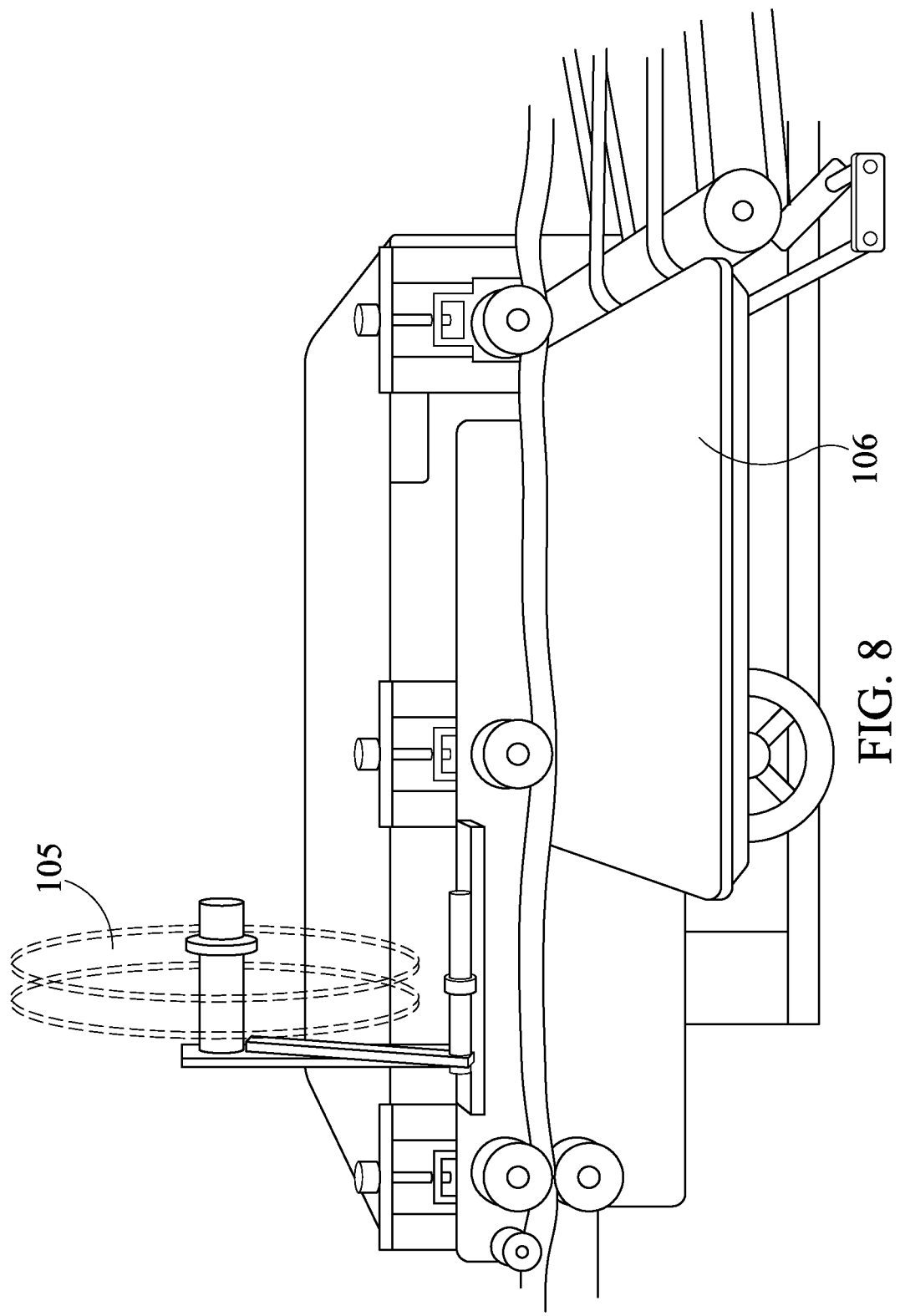
FIG. 8 is a partial front perspective view of a portion of the device shown in FIG. 6 that performs intermediate steps in the manufacturing process.
Figure 9:
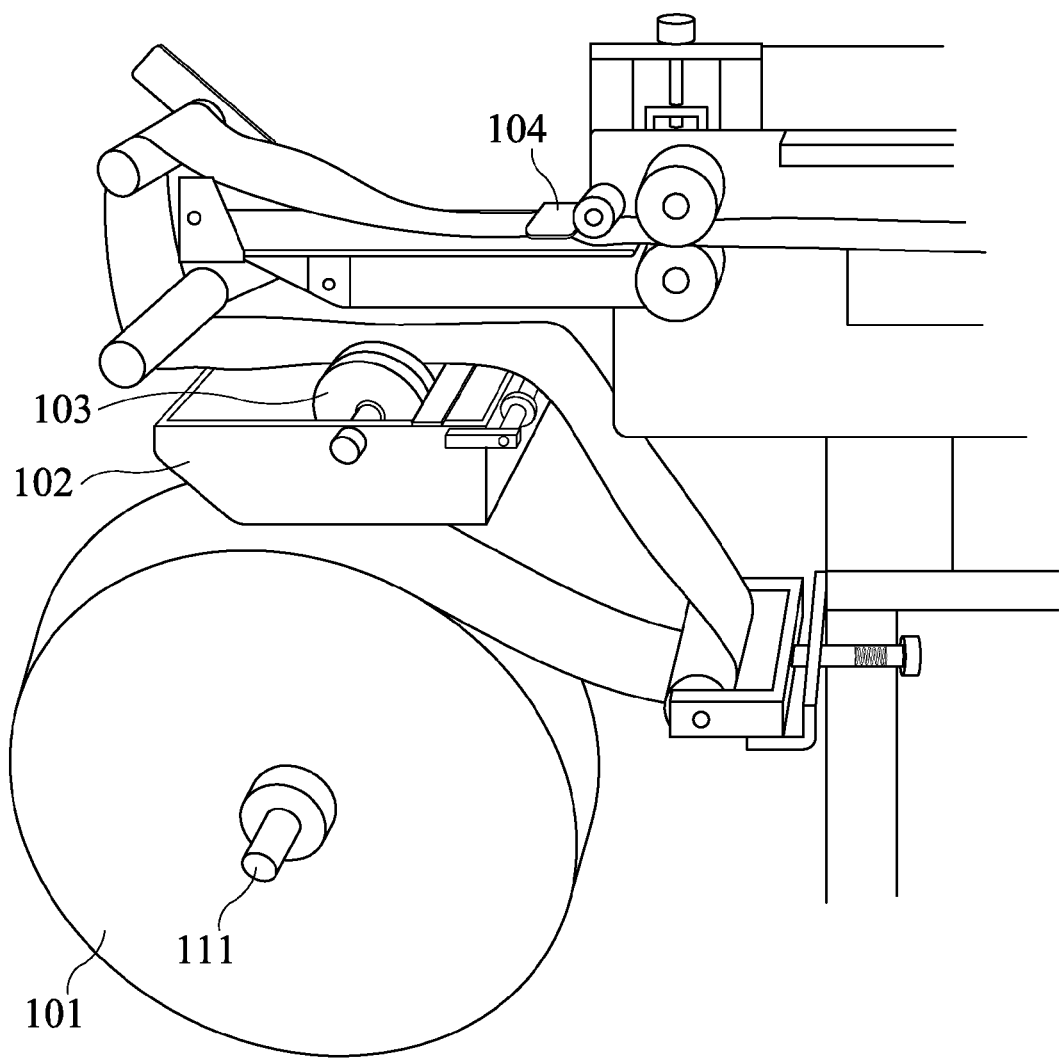
FIG. 9 is a partial front perspective view of a portion of the device shown in FIG. 6 that performs initials steps in the manufacturing process.

FIGS. 6-9 shows a device 100 for making the adhesive strip 1. A roll 101 of an unfolded strip of paper rotates on a paper-roll axel 111. The paper has a lengthwise score 23 pre-formed on the strip. For clarity, the score 23 is not shown in FIGS. 6-9; see FIGS. 1-3 to see the score 23. In the embodiment shown, the paper is not printed; however, in an alternate embodiment, the strip can be printed with an advertisement. The paper then passes over a roller 103. The roller 103 rotates in a vat 102 of adhesive. The roller 103 applies the adhesive 7 and the object adhesive 8 in one application. The unfolded strip with tacky adhesive passes to the fold-making device 104. The fold-making device 104 creases the strip of paper to place the fold 6 on the strip. As shown in FIGS. 6 and 8, a surface adhesive roll 105 is on a spool that is mounted on a surface adhesive roll axel 112. The surface adhesive roll 105 is preferably a roll of double sided tape. As the double-sided tape leaves the roll, a backing 10 remains on the front surface (i.e, the surface facing away from the strip) of the two-sided adhesive 9. The surface adhesive 9 is rolled onto the upper part 21 of the wide part 2 of the folded strip. The strip then moves to the tray 106.

An object (which is not shown in FIG. 6 or 8) is pressed onto the object adhesive 8 while the strip 1 is on the tray 106. The object adhesive 8 is facing upward when the strip 1 arrives at the tray 106. The strip 1 then passes to a shear 107. The shear 107 cuts the strip 1. The distance between cuts is adjusted for different objects being adhered to the strip. A bin 108 receives the completed strips. A control box 109 controls how fast a motor 110 conveys the strip through the device.

I claim:

1. A strip for adhering an object to a surface, comprising:
   a strip folded asymmetrically along a fold line to define a longitudinal axis extending along the fold line, the fold line defining a wide part and a narrow part on opposite sides of the fold line, the wide part having a front face and a rear face and the narrow part having a front face and a rear face, the narrow part narrower than the wide part in a direction perpendicular to the longitudinal axis defined by the fold line, wherein the rear face of the narrow part and wide part is disposed within the fold;
   a tearable score line formed within the wide part and extending parallel to the longitudinal axis defined by the fold line, the tearable score line separating the wide part into an upper part and a lower part, the upper part of the wide part disposed between the narrow part and the lower part of the wide part;
   a two-sided adhesive, a first side of the two-sided adhesive adhered to the front face of the wide part between the tearable score line and the fold line and a second side of the two-sided adhesive adherable to the object; and
   an adhesive disposed below the tearable score line positioned parallel to the longitudinal axis defined by the fold line, the adhesive thereby configured for adherin the rear face of the lower part of the wide part to the rear face of the narrow part to form a loop; and;
   wherein the tearable score line separates the wide part at the score line and is tearable to open the loop, the wide part thereby foldable such that the second side of the two-sided adhesive is adherable to the object.

2. The strip according to claim 1, wherein the strip is a strip of paper.

3. The strip according to claim 1, wherein the two-sided adhesive is double-sided adhesive tape.

4. The strip according to claim 1, further comprising an object adhesive adhered to the rear face of the lower part of the wide part that extends beyond the loop, the object adhesive adherable to engage with the object.

5. The strip according to claim 4, further comprising the object, wherein the object is a bag in adherable engagement with the object adhesive.

6. The strip according to claim 4, further comprising the object, wherein the object is a dispenser for an air freshener in adherable engagement with the object adhesive.

7. The strip according to claim 4, further comprising the object, wherein the object is a writing pad in adherable engagement with the object adhesive.

8. The strip according to claim 4, further comprising the object, wherein the object is a package for facial tissues in adherable engagement with the object adhesive.

9. The strip according to claim 1, further comprising an advertisement printed on the front face of the narrow part.

10. A method for using the strip according to claim 1, comprising:
    tearing the strip along the tearable score line, thereby separating the upper part of the wide part from the lower part of the wide part at the score line to open the loop; and
    folding the upper part of the wide part over the front face of the narrow part after tearing the strip along the tearable score line.

11. The method according to claim 10, further comprising adhering an object to the narrow part before tearing the strip along the tearable score line.

12. A method for using the strip according to claim 1, comprising:
    adhering the object adhesive to a bag, thereby connecting the strip and the bag;
    tearing the strip along the tearable score line, thereby separating the upper part of the wide part from the lower part of the wide part at the score line to open the loop;
    folding the upper part of the wide part over a front of the bag after tearing the strip along the tearable score line; and
    adhering the second side of the two-sided adhesive to the bag.

13. The strip according to claim 1, wherein the strip is configured such that when the strip is torn along the tearable score line the wide part remains engaged with the narrow part of the strip at the fold line, and the upper part of the wide part is foldable over the narrow part of the strip.

14. A strip for adhering an object to a rigid surface, comprising:
    a strip folded asymmetrically along a fold line to define a longitudinal axis extending along the fold line, the fold line defining a wide part and a narrow part on opposite sides of the fold line, the wide part having a front face and a rear face and the narrow part having a front face and a rear face, the narrow part narrower than the wide part in a direction perpendicular to a longitudinal axis defined by the fold line, wherein the rear face of the narrow part and wide part is disposed within the fold;
    a tearable score line formed within the wide part and extending parallel to the longitudinal axis defined by the fold line, the tearable score line separating the wide part into an upper part and a lower part, the upper part of the wide part disposed between the narrow part and the lower part of the wide part;
    a two-sided adhesive tape, a first side of the two-sided adhesive tape adhered to the front face of the wide part between the tearable score line and the fold line and a second side of the two-sided adhesive tape adherable to the object; and
    an adhesive disposed below the tearable score line positioned parallel to the longitudinal axis defined by the fold line, the adhesive thereby configured for adhering the rear face of the lower part of the wide part to the rear face of the narrow part to form a loop; and;
    wherein the tearable score line separates the wide part at the score line and is tearable to open the loop, the wide part thereby foldable such that the second side of the two-sided adhesive is adherable to engage with the object.

15. The strip according to claim 14, wherein the object is a disposable bag and the second side of the two-sided adhesive tape is adherable to the disposable bag to close the bag when the bag is to be disposed.

16. The strip according to claim 15, further comprising an object adhesive adherable to the rear face of the lower part of the wide part that extends beyond the loop, the object adhesive adherable to engage with the disposable bag.

17. A disposable bag adherable to a surface, comprising:
    a) a disposable bag; and
    b) a strip of paper in adherable engagement with the disposable bag, the strip of paper including;

a strip of paper folded asymmetrically along a fold line to define a longitudinal axis extending along the fold line, the fold line defining a wide part and a narrow part on opposite sides of the fold line, the wide part having a front face and a rear face and the narrow part having a front face and a rear face, the wide part having an upper part and a lower part separated by a tearable score line, the narrow part narrower than the wide part in a direction perpendicular to a longitudinal axis defined by the fold line, wherein the rear face of the narrow part and wide part is disposed within the fold;

a two-sided adhesive, a first side of the two-sided adhesive adhered to the front face of the wide part below the fold line and a second side of the two-sided adhesive adherable to the surface;

an adhesive disposed below the tearable score line positioned parallel to the longitudinal axis defined by the fold line, the adhesive adhering the rear face of the lower part of the wide part to the rear face of the narrow part forming a loop; an object adhesive adhered to the rear face of the lower part of the wide part that extends beyond the loop, the object adhesive adhereable to engage the disposable bag; and wherein the tearable score line separates the wide part at the score line, the wide part thereby foldable such that the second side of the two-sided adhesive is adherable to the disposable bag.

18. The disposable bag according to claim 17, wherein the wide part is foldable such that the second side of the two-sided adhesive is adherable with the disposable bag to close the disposable bag.

\* \* \* \* \*

UNITED STATES PATENT AND TRADEMARK OFFICE
CERTIFICATE OF CORRECTION

| | | |
|---|---|---|
| PATENT NO. | : 8,663,768 B2 | |
| APPLICATION NO. | : 12/581391 | |
| DATED | : March 4, 2014 | |
| INVENTOR(S) | : Marcos Gojman Goldberg | |

It is certified that error appears in the above-identified patent and that said Letters Patent is hereby corrected as shown below:

On the Title Page, Item (73)

Please correct the name of the Assignee to read:

-- EL ANCLA BOLSAS Y EMPAQUES, S.A. DE C.V. --

Signed and Sealed this
Twenty-sixth Day of August, 2014

Michelle K. Lee
*Deputy Director of the United States Patent and Trademark Office*